United States Patent [19]
Suwa et al.

[11] Patent Number: 5,768,063
[45] Date of Patent: Jun. 16, 1998

[54] ROTARY ACTUATOR IN DISK DRIVE

[75] Inventors: Masaya Suwa; Yoshinori Ogawa, both of Kawasaki, Japan

[73] Assignee: Fujitsu Limited, Kawasaki, Japan

[21] Appl. No.: 834,079

[22] Filed: Apr. 14, 1997

Related U.S. Application Data

[63] Continuation of Ser. No. 514,299, Aug. 11, 1995, abandoned.

[30] Foreign Application Priority Data

Feb. 2, 1995 [JP] Japan ................... 7-016253

[51] Int. Cl.$^6$ ........................................ G11B 5/55
[52] U.S. Cl. ............................................... 360/106
[58] Field of Search ........................ 360/106, 104–105; 369/215, 219, 249

[56] References Cited

U.S. PATENT DOCUMENTS

| | | | |
|---|---|---|---|
| 5,113,099 | 5/1992 | Wong et al. | 310/13 |
| 5,117,318 | 5/1992 | Immler et al. | 360/106 |
| 5,202,804 | 4/1993 | Takekado | 360/106 |
| 5,608,592 | 3/1997 | Mizoshita et al. | 360/105 |

FOREIGN PATENT DOCUMENTS

| | | |
|---|---|---|
| 1169788 | 7/1989 | Japan. |
| 03214476 | 9/1991 | Japan. |
| 612803 | 1/1994 | Japan. |

*Primary Examiner*—Allen Cao
*Attorney, Agent, or Firm*—Greer, Burns & Crain, Ltd.

[57] ABSTRACT

Disclosed herein is a rotary actuator having a retractor mechanism which can retract magnetic heads to a CSS zone of magnetic disks only by a mechanical bias force in stopping a magnetic disk drive at any cylinder position of the heads. The rotary actuator includes an actuator arm assembly rotatably mounted on a base of the magnetic disk drive, an FPC mounted on one side surface of the actuator arm assembly, and a magnetic circuit constituting a voice coil motor by combination with a moving coil supported to the actuator arm assembly. A retractor plate is fixed to the actuator arm assembly at a position opposite to a mounting position of the FPC with respect to the center of rotation of the actuator arm assembly. The retractor plate functions to retract the magnetic heads to the CSS zone of the magnetic disks by magnetic reaction with a magnetic flux in the magnetic circuit.

18 Claims, 11 Drawing Sheets

ROTARY ACTUATOR IN DISK DRIVE

This application is a continuation of Ser. No. 08/514,299 filed on Aug. 11, 1995.

BACKGROUND OF THE INVENTION

1. Field of the Invention

The present invention relates generally to a rotary actuator in a magnetic disk drive, and more particularly to a retractor mechanism for the actuator.

2. Description of the Related Art

In recent years, the requirement for reduction in size and cost of a magnetic disk drive has been increased. To meet this requirement, it is necessary to make the structure of parts as simple as possible and minimize the number of parts. A small-sized magnetic disk drive for 3.5-inch magnetic disks or the like is driven generally by a 5 V or 12 V D.C. power supply. Accordingly, in a magnetic disk drive adopting a 12 V D.C. power supply, an actuator in the disk drive is driven by a low voltage of 12 V.

In response to the requirement for high-speed access, the actuator is driven by 12 V by switching the direction of a current flowing in a coil of a voice coil motor (VCM) of the actuator. In the case of maintaining the voltage of the VCM near 0 V, the direction of the voltage must be frequently switched, which causes a great difficulty of control due to noise or the like in switching the voltage direction. That is, when a mechanical bias force to the actuator (a reaction force of a flexible printed circuit sheet, a wind force by rotation of a spindle, etc.) is nearly zero in the ontrack condition of the heads, it is difficult to position the heads with a high precision.

In a magnetic disk drive for a computer, a contact start and stop (CSS) system is generally adopted. The CSS system is such that when the magnetic disk drive is stopped or started in operation, the heads mounted on the actuator generally come into contact with a contactable zone (CSS zone) on the innermost cylinder side of the magnetic disks and are positioned on the contactable zone. The reason of positioning the heads on the contactable zone at starting and stopping the disk drive is to avoid CSS on a data zone of the magnetic disks to protect data recorded on the magnetic disks and also reduce a spindle torque necessary in starting the disk drive. Accordingly, a retractor mechanism is required to retract the heads to the CSS zone in stopping the magnetic disk drive under any circumstances.

Japanese Patent Laid-open No. 3-86982 discloses a retractor mechanism employing a leaf spring for applying a force to the actuator in one direction, thereby moving the heads to the CSS zone of the magnetic disks. In this retractor mechanism, however, the leaf spring is repeatedly bent to cause fatigue at a bent portion, resulting in the risk of breakage of the leaf spring. Further, the problem of such bending fatigue is a matter of life of the leaf spring. Therefore, the fatigue is less found in the stage of usual line check where the frequency of bending is less, but the fatigue possibly arises in the future after supplying the product to a user.

Japanese Patent Laid-open No. 2-214076 discloses a retractor mechanism for retracting the heads to the CSS zone by the reaction force of a flexible printed circuit sheet (FPC) or by allowing a current to flow in the VCM by a back electromotive force generated by the inertial rotation of a spindle motor, in addition to the magnetic attraction due to leakage flux from a magnetic body and a VCM. The retractor mechanism disclosed in this publication has limitations in arrangement of the FPC, position of parts mounted on the FPC, etc. Further, it is necessary to provide a circuit for applying the back electromotive force of the spindle motor to the VCM and a select switch for using this circuit. Thus, the number of parts is unavoidably increased to cause a result that the size reduction of the magnetic disk drive cannot be attained.

Japanese Patent Laid-open No. 6-12803 discloses a retractor mechanism for retracting the heads to the CSS zone of the magnetic disks by mounting a magnetic body on a coil supporting portion of a voice coil motor and attracting the magnetic body by leakage flux from a magnet in a magnetic circuit. In this retractor mechanism, however, it is difficult to generate a sufficient rotational moment for the retraction of the heads in a magnetic disk drive having a straight arm structure when the magnetic disks are rotated at high speeds.

Usually, a rotational moment toward the outermost cylinder of the disks is generated in the actuator of the magnetic disk drive by an air flow generated by rotation of the disks. To retract the actuator to the CSS zone, it is necessary to generate a rotational moment toward the innermost cylinder of the disks larger than the rotation moment toward the outermost cylinder of the disks. The actuator disclosed in this publication is a dogleg type of actuator having a structure such that the whole of arms is not inserted between the disks. In such a structure, the rotational moment of the actuator due to the air flow generated by rotation of the disks is much smaller than that of the actuator having the straight arm structure such that the whole of arms are inserted between the disks. Accordingly, in the actuator having dogleg arms, the retractor mechanism disclosed in this publication is considered to effectively function.

Japanese Patent Laid-open No. 6-12803 also discloses a straight arm type of actuator as an embodiment. In the structure shown in the drawings of this publication, however, the rotational moment of the actuator toward the outermost cylinder of the disks due to the air flow at high speeds (5400 rpm or higher) of the disks becomes very large. Accordingly, it is hard to consider that the actuator can be actually retracted to the CSS zone on the innermost cylinder side of the magnetic disks.

As mentioned above, all the conventional retractor mechanisms have various defects. It is accordingly necessary to provide a retractor mechanism which can eliminate the adverse effect of direction switching of voltage in operating the magnetic disk drive and can reliably retract the heads to the CSS zone of the magnetic disks in stopping the magnetic disk drive. Furthermore, it is also required to realize an actuator suppressing moment of inertia and imbalance at a low cost.

SUMMARY OF THE INVENTION

It is therefore an object of the present invention to provide a rotary actuator in a magnetic disk drive having a retractor mechanism which can retract the magnetic heads to the contactable zone of the magnetic disks only by a mechanical bias force in stopping the disk drive under any circumstances.

In accordance with an aspect of the present invention, there is provided a rotary actuator in a magnetic disk drive having a base, comprising an actuator arm assembly rotatably mounted on the base, the actuator arm assembly having one end portion supporting a plurality of magnetic heads and another end portion supporting a moving coil; a flexible printed circuit sheet mounted on one side surface of the actuator arm assembly, for supplying a write signal to each of the magnetic heads and taking out a read signal from each of the magnetic heads; a magnetic circuit fixed to the base and constituting a voice coil motor by combination with the moving coil; and a retractor member formed of a soft magnetic material and fixed to the actuator arm assembly at a position opposite to a mounting position of the flexible printed circuit sheet with respect to a center of rotation of the actuator arm assembly, for retracting the magnetic heads to a contactable zone of magnetic disks by magnetic reaction with a magnetic flux in the magnetic circuit.

The first feature of the present invention is to use a leakage flux or a gap flux in the magnetic circuit of the voice coil motor as a force of retracting the magnetic heads and eliminate the need for providing any special structure for the retractor mechanism in the magnetic circuit.

The second feature of the present invention is that the retractor member mounted on the actuator arm assembly serves also as a counter mass for correcting the imbalance of the actuator arm assembly as a whole, thereby preventing an undue increase in moment of inertia of the actuator.

When the magnetic disk drive is stopped in operation, the retractor member fixed to the actuator arm assembly magnetically reacts with the leakage flux or the gap flux in the magnetic circuit to generate a torque in such a direction that the number of lines of magnetic force passing through the retractor member is increased. This torque operates to move the magnetic heads mounted on one end portion of the actuator arm assembly toward the innermost cylinder of the magnetic disks. Accordingly, the magnetic heads can be retracted to the contactable zone on the innermost cylinder side.

The retractor member may be fixed in position so that also when the magnetic heads are in a retracted position, the torque is generated in the direction such that the number of lines of magnetic force passing through the retractor member is increased. In this case, the actuator can be magnetically locked in the retracted position.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
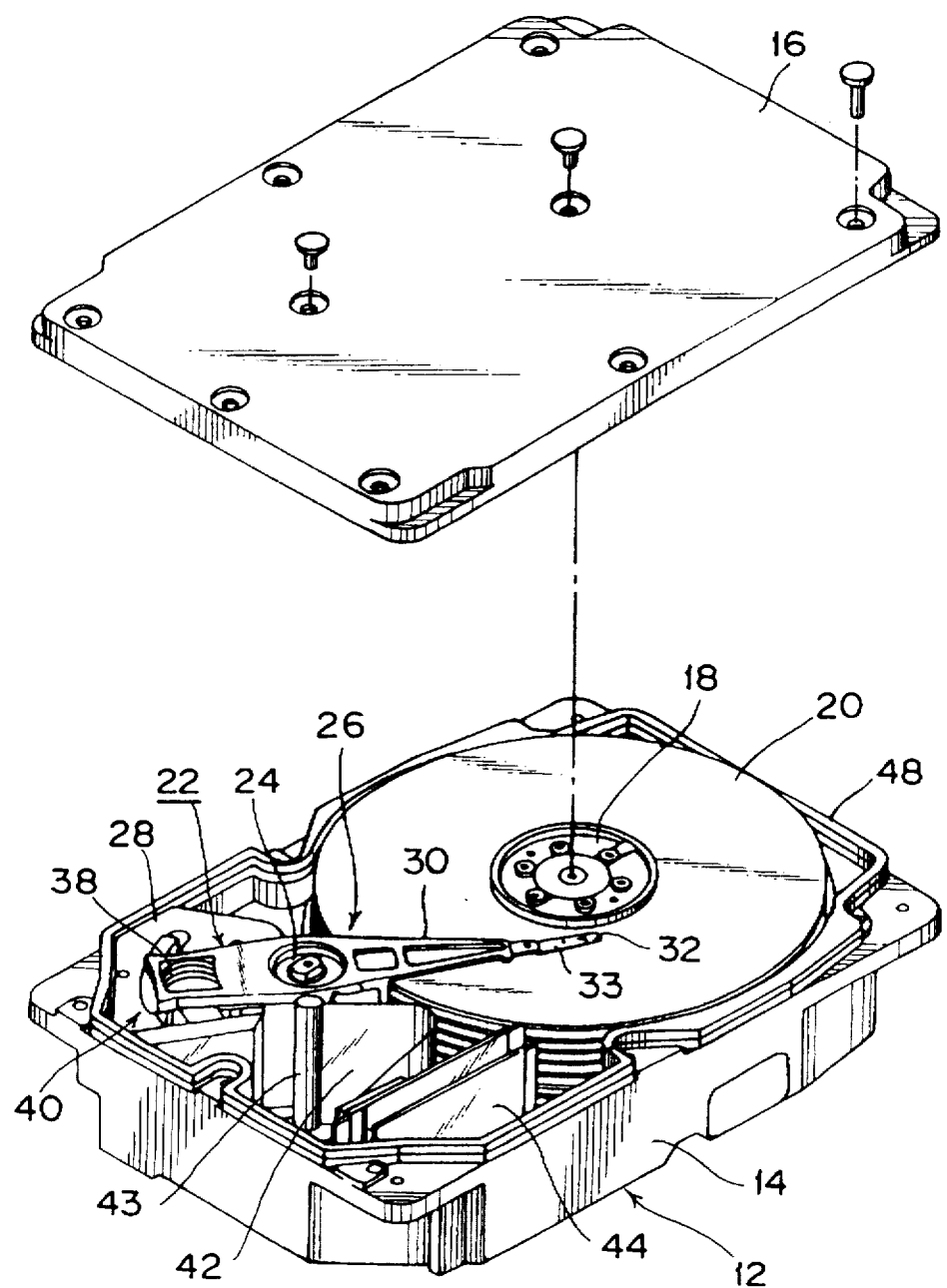
FIG. 1 is a perspective view of a magnetic disk drive to which the present invention is applicable.

Referring to FIG. 1, there is shown a perspective view of a magnetic disk drive having a conventional rotary actuator. The conventional rotary actuator of the magnetic disk drive shown in FIG. 1 is similar to the rotary actuator of the present invention with the exception that the retractor member according to the present invention is not provided.

Reference numeral 12 denotes a housing (disk enclosure) composed of a base 14 and a cover 16. A spindle hub (not shown) to be rotatably driven by an inner hub motor (not shown) is provided on the base 14. A plurality of magnetic disks 20 and spacers (not shown) are alternately stacked and mounted on the spindle hub. That is, the plurality of magnetic disks 20 are regularly spaced from each other by the spacers and are fixedly mounted on the spindle hub by securing a disk clamp 18 to the spindle hub by screws.

Figure 2:
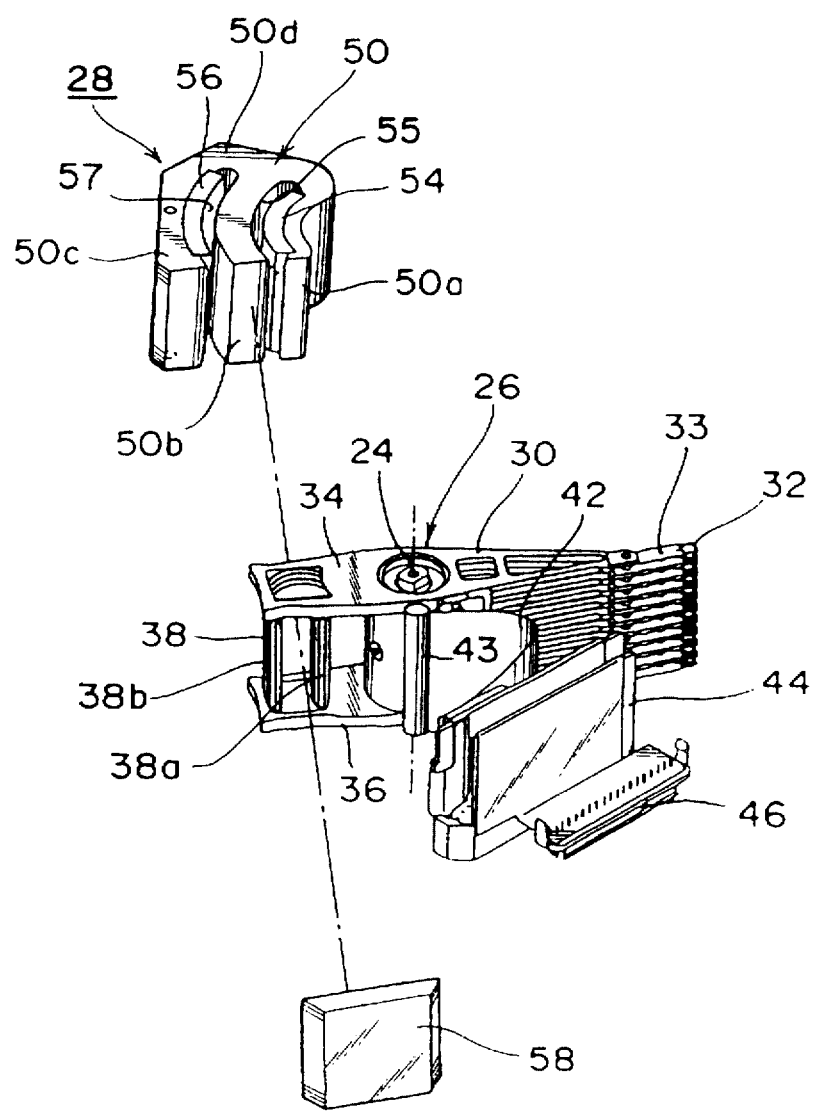
FIG. 2 is an exploded perspective view of an actuator shown in FIG. 1.

Reference numeral 22 denotes a rotary actuator composed of an actuator arm assembly 26 and a magnetic circuit 28. As best shown in FIG. 2, the actuator arm assembly 26 is rotatably mounted on a shaft 24 fixed to the base 14. The actuator arm assembly 26 includes a plurality of actuator arms 30 extending in one direction from the center of rotation and a pair of coil supporting members 34 and 36 extending from the center of rotation in a direction opposite to the direction of extension of the actuator arms 30.

A plurality of spring arms 33 are fixed at their base ends to the front ends of the actuator arms 30, and a plurality of magnetic heads 32 are supported on the front ends of the spring arms 33. A moving coil 38 is supported by the pair of coil supporting members 34 and 36. The moving coil 38 has a pair of effective portions 38a and 38b parallel to the axis of rotation of the actuator arm assembly 26. The effective portions 38a and 38b of the moving coil 38 are inserted in a pair of gaps 55 and 57 of the magnetic circuit 28, respectively, to constitute a voice coil motor (VCM) 40.

Reference numeral 42 denotes a flexible printed circuit sheet (FPC) for supplying a write signal to each magnetic head 32 and taking out a read signal from each magnetic head 32. The FPC 42 is mounted at its one end portion by a clip 43 on a guide to be hereinafter described. The other end portion of the FPC 42 is fixed to the base 14 by a fixing member 44, and is connected to a connector 46.

The magnetic circuit 28 includes an E-shaped main yoke 50 and a side yoke 58. The main yoke 50 has an inner yoke 50a, a center yoke 50b, an outer yoke 50c, and a connecting portion 50d connecting these yokes 50a, 50b, and 50c together. An inner magnet 54 is mounted on the outer circumferential surface of the inner yoke 50a opposed to the center yoke 50b, and an outer magnet 56 is mounted on the inner circumferential surface of the outer yoke 50c opposed to the center yoke 50b. An inner gap 55 is defined between the inner magnet 54 and the center yoke 50b, and an outer gap 57 is defined between the outer magnet 56 and the center yoke 50b.

Referring again to FIG. 1, an annular packing assembly 48 is mounted on the base 14, and the cover 16 is secured by screws to the base 14 with the packing assembly 48 interposed therebetween, thereby sealing the housing 12.

Figure 3:
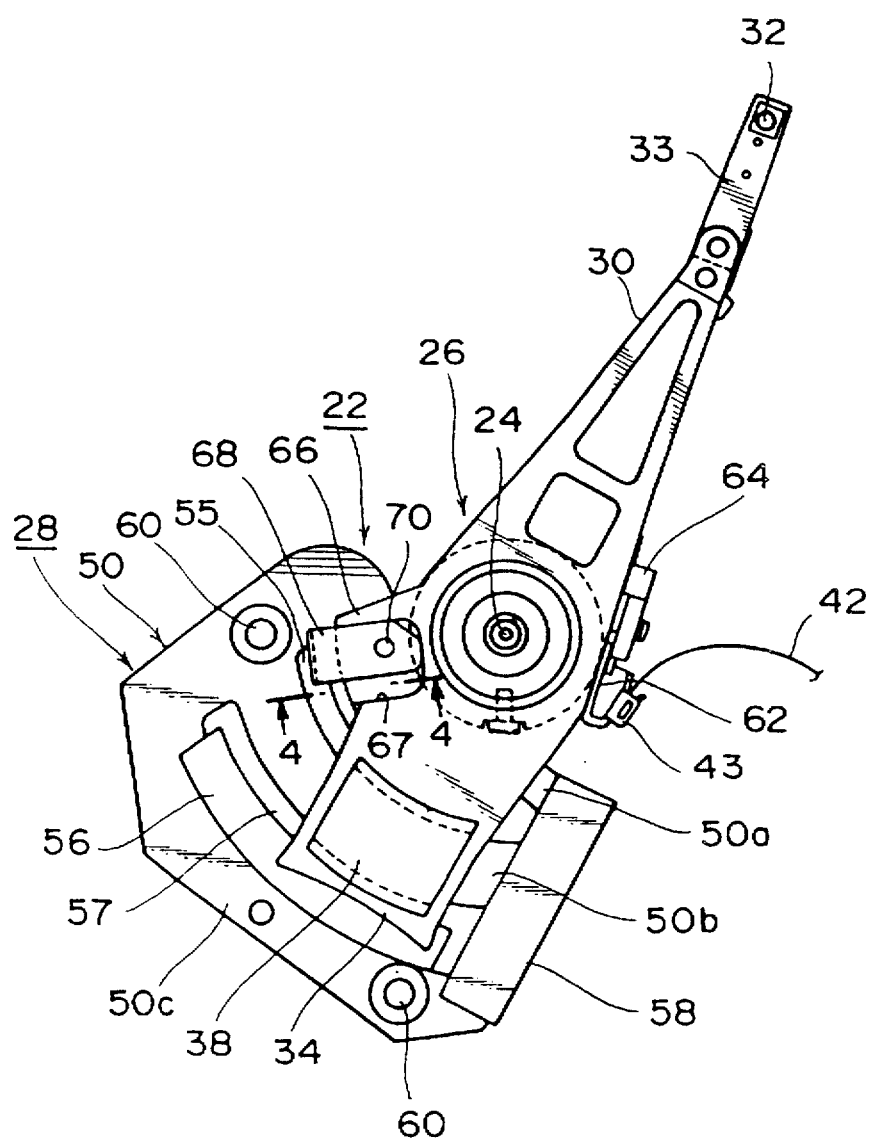
FIG. 3 is a schematic plan view of a first preferred embodiment of the present invention.
Figure 5:
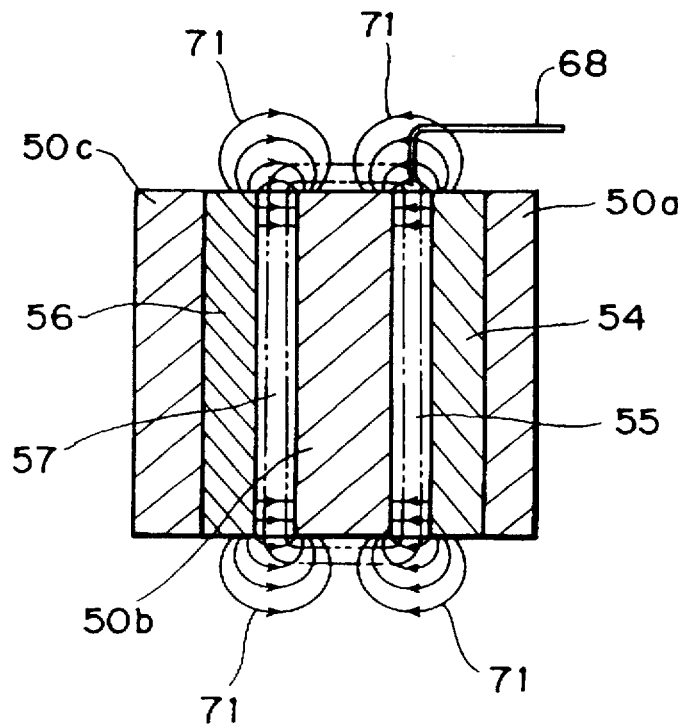
FIG. 5 is a vertical sectional view of a magnetic circuit in the first preferred embodiment.

Referring to FIG. 3, there is shown a plan view of a first preferred embodiment of the present invention. Substantially the same as those shown in FIGS. 1 and 2 are denoted by the same reference numerals, and the description thereof will be omitted to avoid the repetition. As similar to the magnetic circuit shown in FIG. 2, a magnetic circuit 28 in this preferred embodiment includes an E-shaped main yoke 50 and a side yoke 58. The E-shaped main yoke 50 is fixed to the base 14 by screws 60. The side yoke 58 is fixed to the main yoke 50 by the magnetic forces of an inner magnet 54 and an outer magnet 56. As shown in FIG. 5, an inner gap 55 and an outer gap 57 of the magnetic circuit 28 are open at their upper and lower ends, and leakage fluxes 71 are present about these open ends of the gaps 55 and 57. The leakage fluxes 71 curvedly pass over the inner gap 55 and the outer gap 57 at their open ends.

Referring again to FIG. 3, a flexible printed circuit sheet (FPC) 42 for supplying a write signal to each magnetic head 32 and taking out a read signal from each magnetic head 32 is fixed by screws on one side surface of the actuator arm assembly 26 with a guide 62 and an FPC pressing member 64. The FPC 42 is fixed to the guide 62 by a clip 43. The actuator arm assembly 26 is integrally formed with a projecting portion 66 at a position opposite to the mounting position of the FPC 42 with respect to the center of rotation of the actuator arm assembly 26. The projecting portion 66 has a sectoral shape about the shaft 24 whose axis is the center of rotation of the actuator arm assembly 26. The projecting portion 66 is formed with a shallow groove 67 and a screw hole. An L-shaped retractor plate 68 formed from a silicon steel plate is set in the shallow groove 67 and is fixed to the projecting portion 66 by threadedly engaging a screw 70 into the screw hole.

Figure 4:
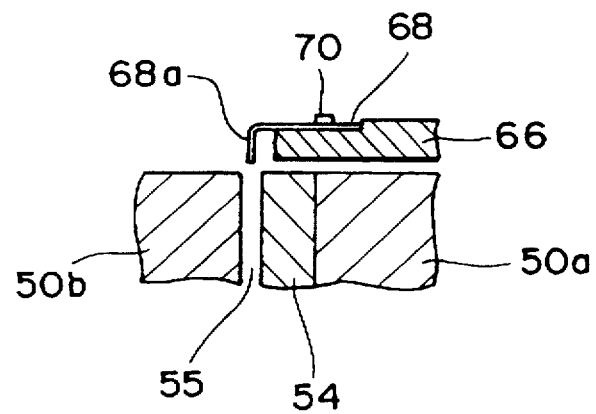
FIG. 4 is a cross section taken along the line A—A in FIG. 3.

As best shown in FIG. 4, a front bent portion 68a of the retractor plate 68 is located over the radial center of the inner gap 55 in the magnetic circuit, and as shown in FIG. 5, the front bent portion 68a intersects the leakage flux 71 at substantially right angles. The retractor plate 68 is mounted on the projecting portion 66 of the actuator arm assembly 26 in respect of its circumferential direction so that a torque for moving the actuator arm assembly 26 toward the innermost cylinder of the magnetic disks by magnetic attraction of the leakage flux 71 generated at any moving position of the actuator arm assembly 26 in the movable range thereof. The retractor plate 68 operates in its movable range so as to receive a force in such a direction that the number of lines of magnetic force as the leakage flux 71 passing through the retractor plate 68 is increased, that is, so that the more the magnetic heads 32 approach the innermost cylinder of the magnetic disks, the larger the magnetic force (attractive force) becomes.

FIG. 3 shows a condition where the magnetic heads 32 mounted on the actuator arm assembly 26 are retracted to a CSS zone on the innermost cylinder side of the magnetic disks. In this condition, a part of the front bent portion 68a of the retractor plate 68 does not overlap the inner gap 55. By fixing the retractor plate 68 to the projecting portion 66 in such a positional relation, the torque toward the innermost cylinder is generated even in the retracted condition, so that the actuator arm assembly 26 can be magnetically locked at the retracted position. As apparent from FIGS. 4 and 5, the retractor plate 68 is in perfect noncontact with the magnetic circuit 28.

Figure 6A:
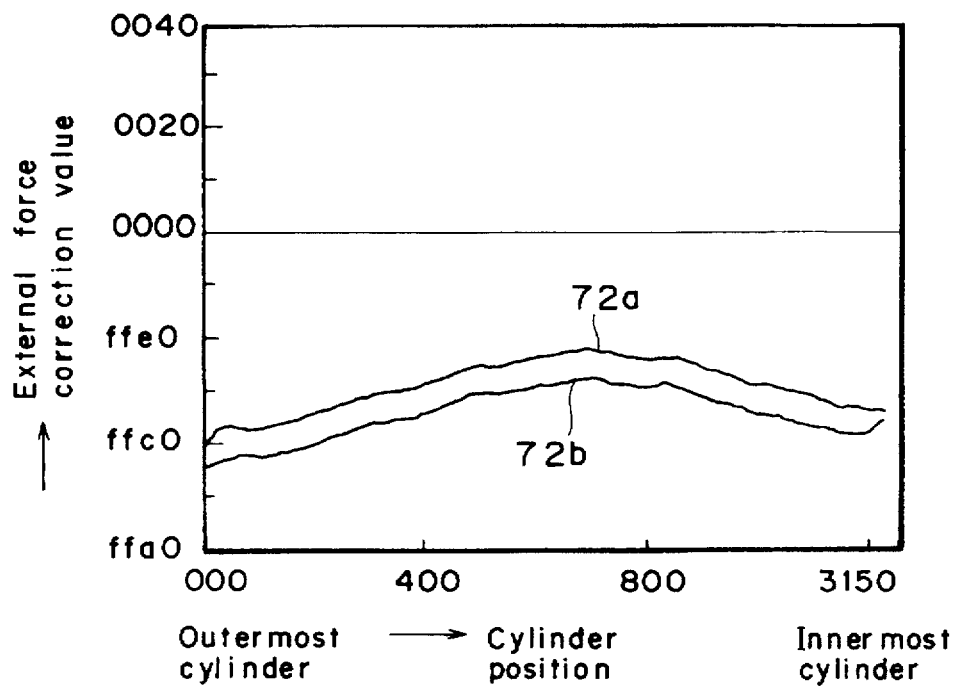
FIG. 6A is a graph showing an external force correction value in the actuator according to the first preferred embodiment of the present invention.

Referring to FIG. 6A, there is shown a graph of measurement of external force correction values in the first preferred embodiment. The curve 72a is a plot of external force correction values when moving the magnetic heads from the outermost cylinder to the innermost cylinder, whereas the curve 72b is a plot of external force correction values when moving the magnetic heads from the innermost cylinder to the outermost cylinder. As apparent from FIG. 6A, the external force correction values are suppressed below zero over the swing range of the actuator arm assembly 26. This result means that a bias torque toward the innermost cylinder is always generated. Therefore, regardless of head positions over any cylinders of the magnetic disks, the magnetic heads can be retracted to the CSS zone on the innermost cylinder side by the above bias torque.

Figure 6B:
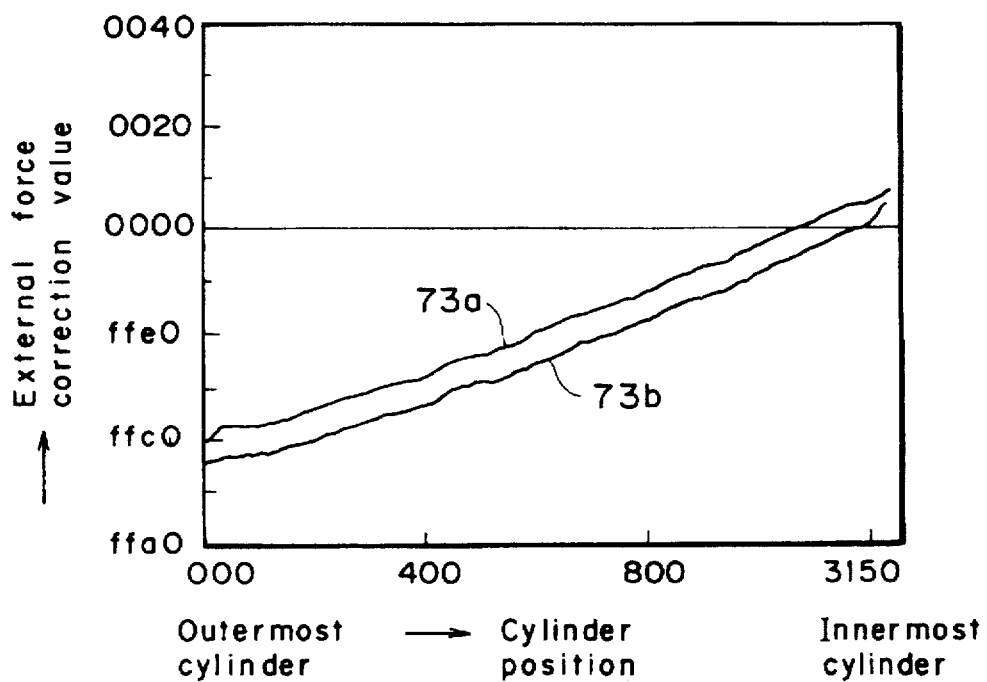
FIG. 6B is a graph similar to FIG. 6A, showing a comparison wherein no retractor plate is mounted.

FIG. 6B is a graph of measurement of external force correction values in the case where no retractor plate is mounted on the projecting portion. The curve 73a is a plot of external force correction values when moving the magnetic heads from the outermost cylinder to the innermost cylinder, whereas the curve 73b is a plot of external force correction values when moving the magnetic heads from the innermost cylinder to the outermost cylinder. As apparent from FIG. 6B, the external force correction values near the innermost cylinder in both cases are greater than zero. This result means that a bias torque toward the outermost cylinder is generated near the innermost cylinder. Therefore, in this comparison wherein no retractor plate is mounted on the projecting portion, the magnetic heads cannot always be retracted to the CSS zone on the innermost cylinder side over the swing range of the actuator arm assembly only by a mechanical bias force.

With the above-mentioned structure of the rotary actuator according to this preferred embodiment, the following effects can be simultaneously obtained.

(1) In the ontrack condition of the magnetic heads over all cylinders of the magnetic disks, the ontrack accuracy can be improved without the adverse effect of direction switching of voltage.

(2) The magnetic heads can be reliably retracted to the CSS zone only by a mechanical bias force in stopping the disk drive.

(3) The projecting portion is formed opposite to the FPC with respect to the center of rotation of the actuator arm assembly, and the retractor plate is fixed to the projecting portion. Therefore, the mass balance of the actuator arm assembly can be improved.

(4) The mass of the projecting portion of the actuator arm assembly and the retractor plate is originally required to correct the imbalance of the actuator arm assembly due to the mass of the FPC and its associated parts. Accordingly, the addition of the retractor mechanism does not cause an increase in moment of inertia.

(5) No change in the magnetic circuit of the VCM is required, and the retractor plate mounted on the actuator arm assembly is very inexpensive, thereby realizing a cost reduction.

(6) The vertically bent, front portion of the retractor plate is positioned over the radial center of the inner gap of the magnetic circuit so as to intersect the lines of magnetic force, or the leakage flux at substantially right angles. Accordingly, variations in bias torque can be reduced for variations in mounting dimensions of the retractor plate.

(7) Since the retractor plate is in noncontact with the magnetic circuit, the generation of dust can be prevented to ensure a high reliability.

(8) The projecting portion for fixing the retractor plate has a sectoral shape about the center of rotation of the actuator arm assembly. Therefore, the rigidity of the actuator arm assembly in the seeking direction thereof can be increased, and the bias torque near the innermost cylinder can also be increased to eliminate the need for providing an independent actuator lock.

Figure 7:
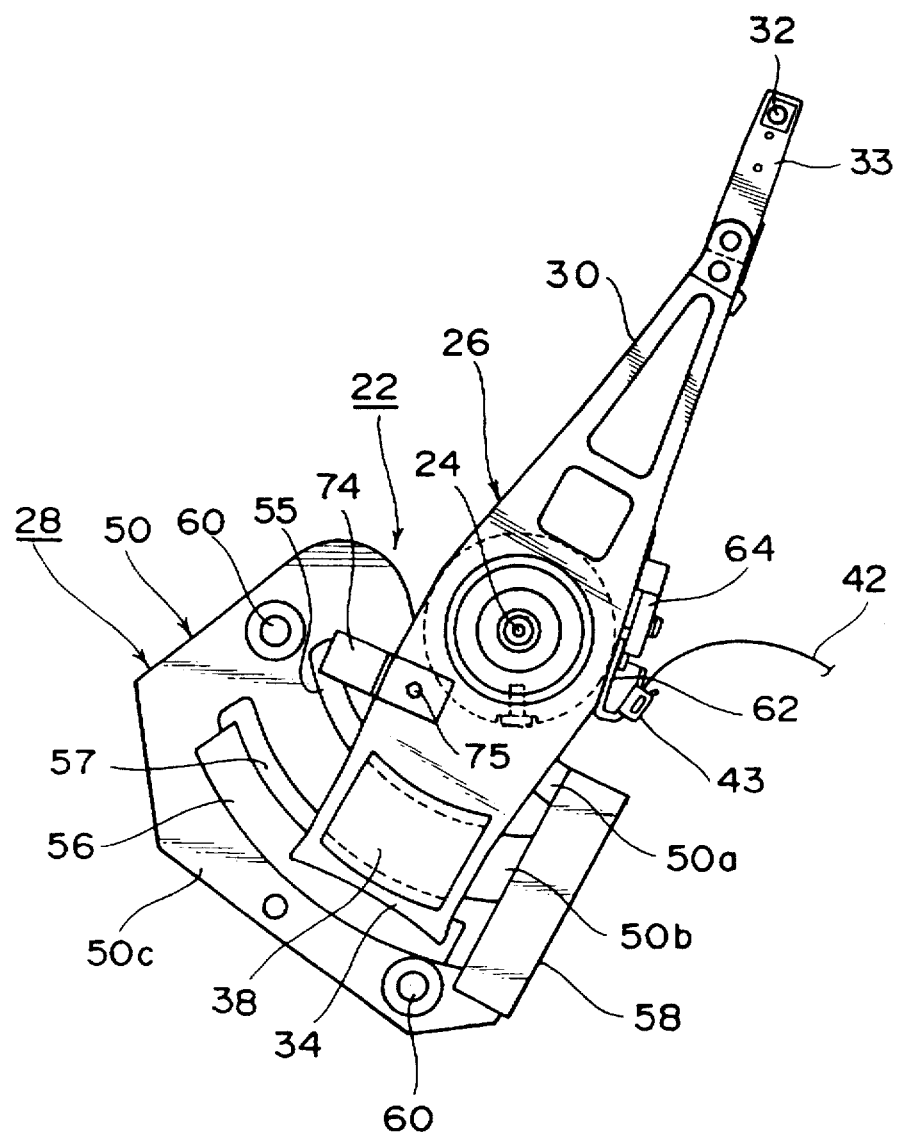
FIG. 7 is a schematic plan view of a second preferred embodiment of the present invention.

FIG. 7 shows a plan view of a second preferred embodiment of the present invention. The same parts as those of the first preferred embodiment mentioned above are denoted by the same reference numerals, and the description thereof will be omitted to avoid the repetition. An actuator arm assembly 26 according to this preferred embodiment does not have the projecting portion 66 of the first preferred embodiment.

A crank-shaped retractor plate 74 formed from a silicon steel plate is bonded to the actuator arm assembly 26 at a position opposite to the mounting position of the FPC 42 with respect to the center of rotation of the actuator arm assembly 26. The retractor plate 74 has a hole 75, and the hole 75 is filled with an adhesive to thereby increase a bonding area and accordingly increase a bonding strength.

Figure 8:
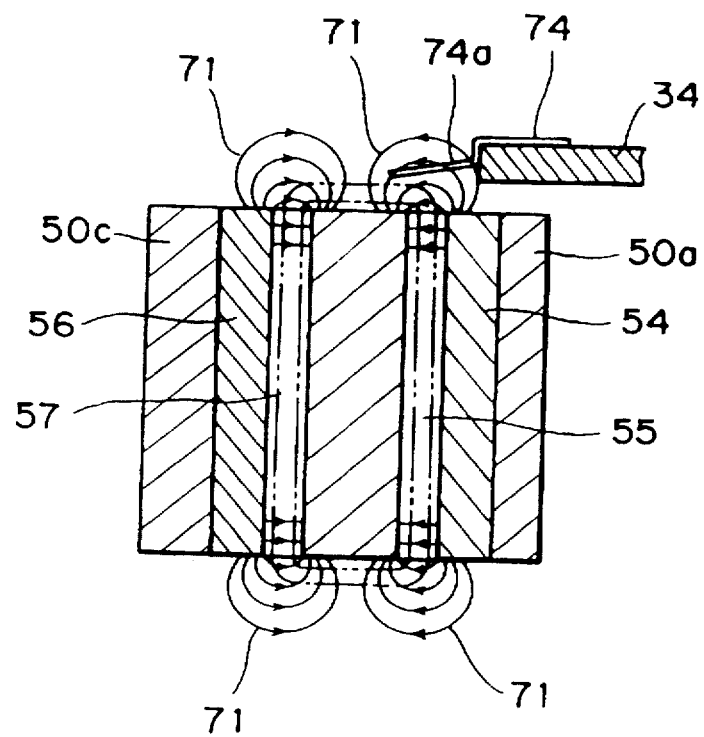
FIG. 8 is a vertical sectional view of a magnetic circuit in the second preferred embodiment.

As shown in FIG. 8, a front end portion 74a of the retractor plate 74 is substantially parallel to the upper end surface of the magnetic circuit. More strictly, the front end portion 74a is slightly inclined downward to the upper end surface of the magnetic circuit. An angle of inclination of the front end portion 74a is decided so as to optimize the bias torque of the actuator arm assembly 26. As similar to the first preferred embodiment, the retractor plate 74 is in noncontact with the magnetic circuit.

FIG. 7 shows a condition where the magnetic heads 32 are retracted to the CSS zone of the magnetic disks. The retractor plate 74 is mounted on the actuator arm assembly 26 in such a manner that a part of the front end portion 74a of the retractor plate 74 does not overlap the inner gap 55 in this retracted condition. By fixing the retractor plate 74 to the actuator arm assembly 26 in such a positional relation, the bias torque toward the innermost cylinder can be obtained even in the retracted condition of the magnetic heads 32, thereby allowing the actuator arm assembly 26 to be magnetically locked in the retracted position.

The rotary actuator according to this preferred embodiment has effects similar to those of the first preferred embodiment mentioned above. However, variations in the bias torque for variations in mounting dimensions of the retractor plate 74 are greater than those in the first preferred embodiment, so that dimension control for the retractor plate 74 is required in the second preferred embodiment.

Figure 9:
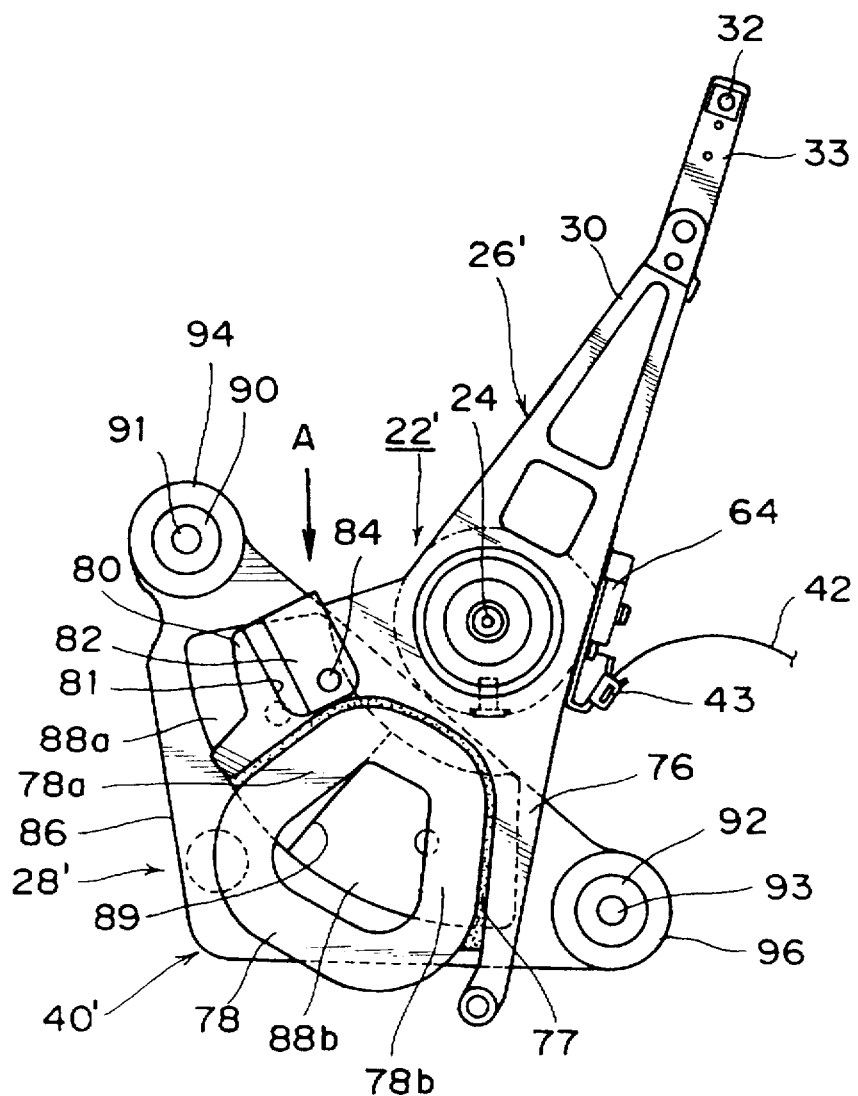
FIG. 9 is a schematic plan view of a third preferred embodiment of the present invention.

FIG. 9 shows a schematic plan view of a third preferred embodiment of the present invention. Substantially the same parts as those of the first and second preferred embodiments mentioned above are denoted by the same reference numerals, and the description thereof will be omitted to avoid the repetition. A rotary actuator 22' according to this preferred embodiment employs a flat coil type of VCM 40' as a driving source.

A flat coil 78 is bonded by an adhesive 77 to a coil supporting member 76 of an actuator arm assembly 26'. The flat coil 78 has a pair of effective portions 78a and 78b perpendicular to the axis of rotation of the actuator arm assembly 26'. A magnetic circuit 28' as a stator of the VCM 40' includes a lower yoke 86 fixed to the base 14. The lower yoke 86 has a pair of spacers 90 and 92 each having a predetermined height. The spacers 90 and 92 have central holes 91 and 93, respectively. An annular rubber stop 94 serving as an outer stopper is mounted on the outer circumferential surface of the spacer 90. Similarly, an annular rubber stop 96 serving as an inner stopper is mounted on the outer circumferential surface of the spacer 92.

A first lower magnet 88a and a second lower magnet 88b are fixedly mounted on the upper surface of the lower yoke 86 in such a manner that the two magnets 88a and 88b are in contact with each other at a central position 89 in the seeking direction, or the circumferential direction of the magnetic circuit 28'. Each of the first and second lower magnets 88a and 88b has upper and lower magnetic poles. The upper and lower magnetic poles of the first and second lower magnets 88a and 88b are magnetized in such a manner that the polarities of the magnetic poles of the first lower magnet 88a are opposite to those of the magnetic poles of the second lower magnet 88b. Although not shown in FIG. 9, the magnetic circuit 28' further includes an upper yoke 98 (see FIG. 10), a first upper magnet 100a (see FIG. 10), and a second upper magnet. The first upper magnet 100a and the second upper magnet are fixed to the lower surface of the upper yoke 98 in the same manner as that mentioned above regarding the first and second lower magnets 88a and 88b.

Figure 10:
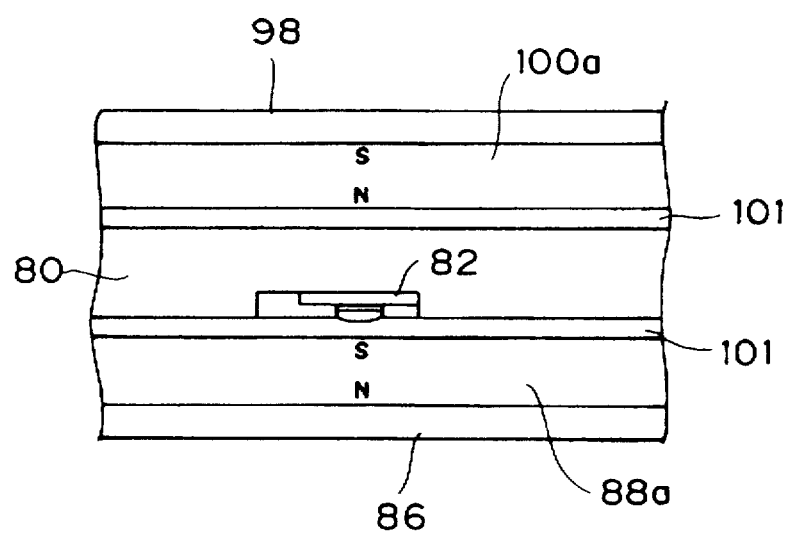
FIG. 10 is a view taken in the direction of the arrow A in FIG. 9.

As shown in FIG. 10, a gap 101 is defined between the first lower magnet 88a and the first upper magnet 100a, and another similar gap is also defined between the second lower magnet 88b and the second upper magnet. The effective portion 78a of the flat coil 78 is inserted in the gap 101 defined between the first lower magnet 88a and the first upper magnet 100a, and the other effective portion 78b of the flat coil 78 is inserted in the gap defined between the second lower magnet 88b and the second upper magnet.

The actuator arm assembly 26' is integrally formed with a projecting portion 80 at a position opposite to the mounting position of the FPC 42 with respect to the center of rotation of the actuator arm assembly 26'. The projecting portion 80 is formed with a shallow groove 81. A flat retractor plate 82 formed from a silicon steel plate is set in the shallow groove 81 and is fixed to the projecting portion 80 by a screw 84. The more the magnetic heads 32 approach the innermost cylinder of the magnetic disks, the larger the area of the retractor plate 82 inserted into the gap in the magnetic circuit becomes to increase the magnetic attractive force applied to the retractor plate 82. Accordingly, regardless of the head position over any cylinder, the bias torque toward the innermost cylinder can be obtained.

FIG. 9 shows a condition where the magnetic heads 32 are retracted to the CSS zone. In this condition, a part of the front end portion of the retractor plate 82 is not inserted in the gap 101. Accordingly, the bias torque toward the innermost cylinder can be obtained even in the retracted position, thereby allowing the actuator arm assembly 26' to be magnetically locked in the retracted position. Further, as similar to the first and second preferred embodiments, the retractor plate 82 is fixed to the actuator arm assembly 26' at a position opposite to the mounting position of the FPC 42. Accordingly, the retractor plate 82 serves also as a counter mass for correcting the imbalance of the actuator arm assembly 26' due to the mass of the FPC 42 and its associated parts.

Figure 11:
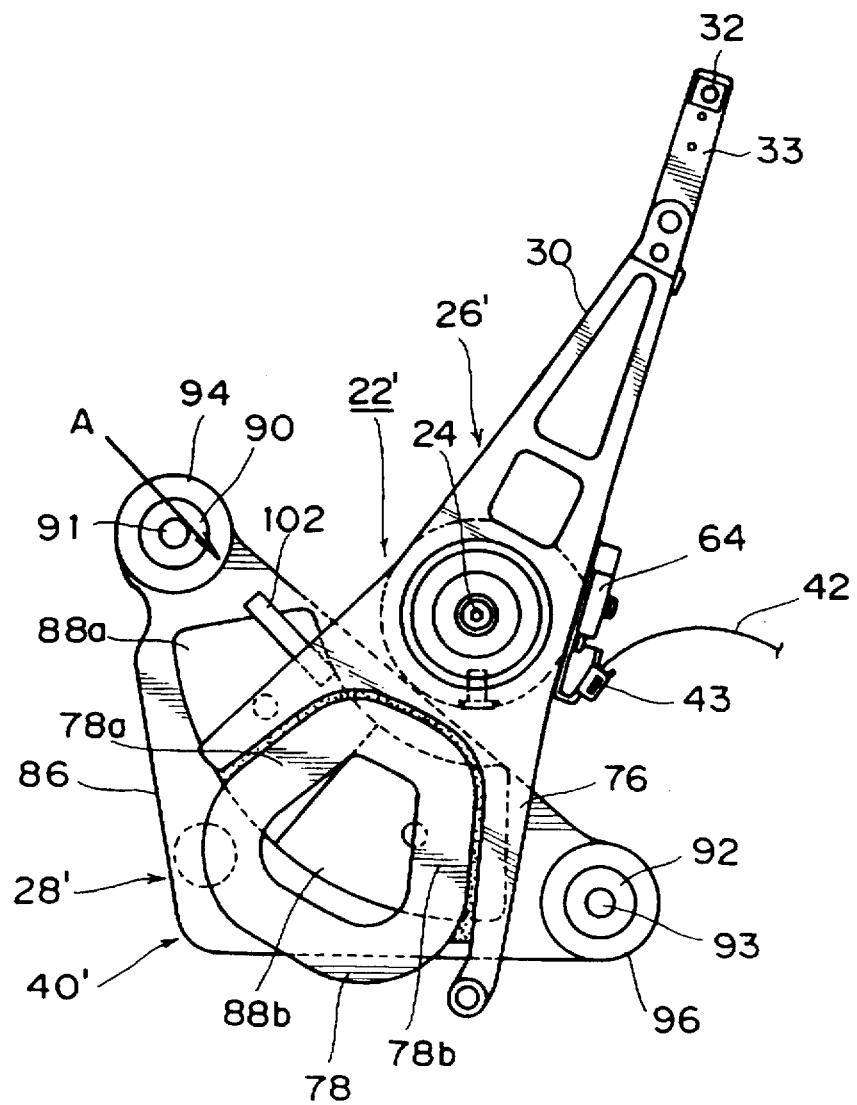
FIG. 11 is a schematic plan view of a fourth preferred embodiment of the present invention.
Figure 12:
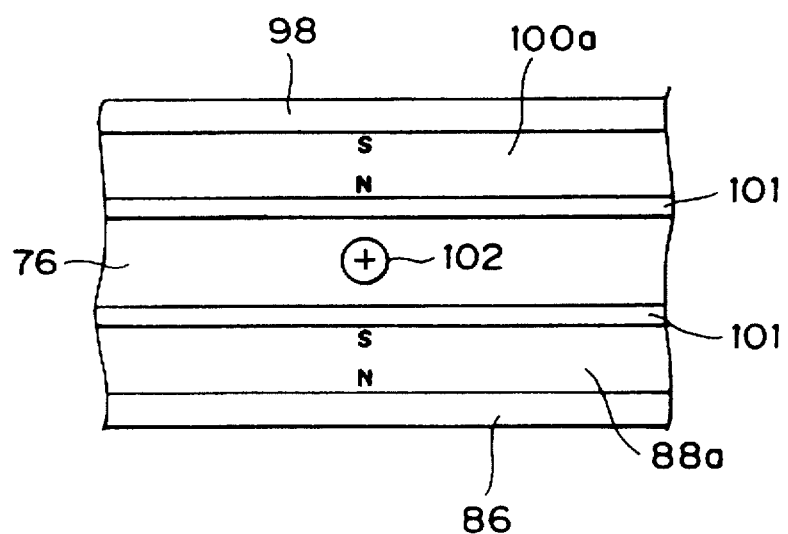
FIG. 12 is a view t en in the direction of the arrow A in FIG. 11.

FIG. 11 shows a schematic plan view of a fourth preferred embodiment of the present invention. This preferred embodiment is similar to the third preferred embodiment mentioned above. Accordingly, the same parts as those of the third preferred embodiment are denoted by the same reference numerals, and the description thereof will be omitted to avoid the repetition. In this preferred embodiment, a hole 76a is formed on the side surface of the coil supporting member 76 of the actuator arm assembly 26' at a position opposite to the mounting position of the FPC 42 with respect to the center of rotation of the actuator arm assembly 26'. A retractor rod 102 formed from a nickel-plated soft magnetic iron rod is press-fitted with the hole 76a of the coil supporting member 76.

The retractor rod 102 is fixed to the coil supporting member 76 so that the more the magnetic heads 32 approach the innermost cylinder of the magnetic disks, the larger the area of the retractor rod 102 inserted into the gap in the magnetic circuit becomes. Accordingly, the bias torque toward the innermost cylinder can be obtained regardless of the head position over any cylinder. As similar to the previous preferred embodiments, the retractor rod 102 is fixed to the actuator arm assembly 26' at a position opposite to the mounting position of the FPC 42. Accordingly, the retractor rod 102 serves also as a counter mass for correcting the imbalance of the actuator arm assembly 26' due to the mass of the FPC 42 and its associated parts.

In the third and fourth preferred embodiments, the magnetic circuit 28' is so constructed that the first and second lower magnets are fixed to the lower yoke 86, and the first and second upper magnets are fixed to the upper yoke 98. As a modification, the present invention may adopt another type of magnetic circuit such that first and second magnets are fixed to either the lower yoke 86 or the upper yoke 98.

According to the present invention as described above, it is possible to provide a rotary actuator having a good mass balance which can eliminate the adverse effect of direction switching of voltage in operating the disk drive and can reliably retract the magnetic heads to the CSS zone in stopping the disk drive. The present invention also has the effects (1) to (8) mentioned above in addition to the above effects.

What is claimed is:

1. A rotary actuator in a disk drive having a base, comprising:

an actuator arm assembly rotatably mounted on said base, said actuator arm assembly having one end portion supporting a plurality of heads and another end portion supporting a moving coil;

a flexible printed circuit sheet mounted on one side surface of said actuator arm assembly, for supplying a write signal to each of said heads and receiving a read signal from each of said heads;

a magnetic circuit fixed to said base and constituting a voice coil motor in combination with said moving coil; and a retractor member formed of a magnetic material and fixed to said actuator arm assembly at a position opposite to a mounting position of said flexible printed circuit sheet with respect to a center of rotation of said actuator arm assembly, said retractor member retracting said heads to a contactable zone of a disk by a magnetic reaction with a magnetic flux in said magnetic circuit of said voice coil motor.

2. A rotary actuator in a disk drive according to claim 1, wherein:

said magnetic circuit comprises a main yoke fixed to said base and having an inner yoke, a center yoke, and an outer yoke; an inner magnet mounted on an outer circumferential surface of said inner yoke opposed to said center yoke; and an outer magnet mounted on an inner circumferential surface of said outer yoke opposed to said center yoke; and said moving coil has first and second effective portions parallel to an axis of rotation of said actuator arm assembly, said first effective portion being inserted in an inner gap defined between said inner magnet and said center yoke, said second effective portion being inserted in an outer gap defined between said outer magnet and said center yoke.

3. A rotary actuator in a disk drive according to claim 1, wherein:

said magnetic circuit comprises a lower yoke fixed to said base; an upper yoke fixed to said lower yoke in vertically spaced relationship with each other; and a magnet fixed to one of an upper surface of said lower yoke and a lower surface of said upper yoke, said magnet comprising first and second segments contacting together at a central position in a circumferential direction thereof, each of said first and second segments having upper and lower magnetic poles, said upper and lower magnetic poles of said first segment being opposite in polarity to those of said second segment; and said moving coil comprises a flat coil having first and second effective portions perpendicular to an axis of rotation of said actuator arm assembly, said first effective portion being inserted in a first gap defined between said first segment of said magnet and one of said lower yoke and said upper yoke, said second effective portion being inserted in a second gap defined between said second segment of said magnet and one of said lower yoke and said upper yoke and having lines of magnetic force opposite in direction to those in said first gap.

4. A rotary actuator in a disk drive according to claim 3, wherein said magnet comprises a lower magnet fixed to the upper surface of said lower yoke and an upper magnet fixed to the lower surface of said upper yoke, each of said lower magnet and said upper magnet is divided into said first and second segments contacting together at the central position in the circumferential direction thereof, each of said first and second segments having upper and lower magnetic poles, said upper and lower magnetic poles of said first segment being opposite in polarity to those of said second segment.

5. A rotary actuator in a disk drive having a base, comprising:

an actuator arm assembly rotatably mounted on said base, said actuator arm assembly having one end portion supporting aplurality of heads and another end portion supporting a moving coil, said moving coil having first and second effective portions parallel to an axis of rotation of said actuator arm assembly;

a flexible printed circuit sheet mounted on one side surface of said actuator arm assembly, for supplying a write signal to each of said heads and receiving a read signal from each of said heads;

a magnetic circuit fixed to said base and constituting a voice coil motor in combination with said moving coil, said magnetic circuit including:

a main yoke fixed to said base, said main yoke having an inner yoke, a center yoke, and an outer yoke;

an inner magnet mounted on an outer circumferential surface of said inner yoke opposed to said center yoke; and an outer magnet mounted on an inner circumferential surface of said outer yoke opposed to said center yoke, said first effective portion of said moving coil being inserted in an inner gap defined between said inner magnet and said center yoke, said second effective portion of said moving coil being inserted in an outer gap defined between said outer magnet and said center yoke; and a retractor member formed of a magnetic material and fixed to said actuator arm assembly at a position opposite to a mounting position of said flexible printed circuit sheet with respect to a center of rotation of said actuator arm assembly, said retractor member retracting said heads to a contactable zone of disks by a magnetic reaction with a leakage flux generated over an open upper end surface of said magnetic circuit.

6. A rotary actuator in a disk drive according to claim 5, wherein said retractor member is fixed in a position such that when said magnetic heads are in a retracted position, said actuator arm assembly is magnetically locked in the retracted position.

7. A rotary actuator in a disk drive according to claim 5, wherein said retractor member is fixed to said actuator arm assembly so that when said heads are retracted to said contactable zone of said disks, a torque toward an innermost cylinder of said disks is generated.

8. A rotary actuator in a disk drive according to claim 7, wherein said actuator arm assembly has a projecting portion at the position opposite to the mounting portion of said flexible printed circuit sheet with respect to the center of rotation, and said retractor member is fixed to said projecting portion.

9. A rotary actuator in a disk drive according to claim 8, wherein said projecting portion has a sectoral shape about the axis of rotation of said actuator arm assembly.

10. A rotary actuator in a disk drive according to claim 8, wherein said retractor member comprises an L-shaped retractor plate having a front bent portion, said L-shaped retractor plate being fixed to said actuator arm assembly so that said front bent portion intersects said leakage flux at substantially right angles.

11. A rotary actuator in a disk drive according to claim 7, wherein said retractor member comprises a crank-shaped retractor plate having a front portion extending so as to gradually approach said open upper end surface of said magnetic circuit.

12. A rotary actuator in a disk drive having a base, comprising:

an actuator arm assembly rotatably mounted on said base, said actuator arm assembly having one end portion supporting a plurality of heads and another end portion supporting a flat moving coil, said moving coil having first and second effective portions perpendicular to an axis of rotation of said actuator arm assembly;

a flexible printed circuit sheet mounted on one side surface of said actuator arm assembly, for supplying a write signal to each of said heads and receiving a read signal from each of said heads;

a magnetic circuit fixed to said base and constituting a voice coil motor in combination with said moving coil, said magnetic circuit including:

a lower yoke fixed to said base;

an upper yoke fixed to said lower yoke in vertically spaced relationship with each other; and a magnet fixed to one of an upper surface of said lower yoke and a lower surface of said upper yoke, said magnet comprising first and second segments contacting together at a central position in a circumferential direction thereof, each of said first and second segments having upper and lower magnetic poles, said upper and lower magnetic poles of said first segment being opposite in polarity to those of said second segment;

said first effective portion of said moving coil being inserted in a first gap defined between said first segment of said magnet and one of said lower yoke and said upper yoke, said second effective portion of said moving coil being inserted in a second gap defined between said second segment of said magnet and one of said lower yoke and said upper yoke and having lines of magnetic force opposite in direction to those in said first gap; and a retractor member formed of a magnetic material and fixed to said actuator arm assembly at a position opposite to a mounting position of said flexible printed circuit sheet with respect to a center of rotation of said actuator arm assembly, for retracting said heads to a contactable zone of disks by magnetic reaction with a magnetic flux generated in said first and second gaps of said magnetic circuit.

13. A rotary actuator in a disk drive according to claim 12, wherein said retractor member is fixed in a position such that when said magnetic heads are in a retracted position, said actuator arm assembly is magnetically locked in the retracted position.

14. A rotary actuator in a disk drive according to claim 12, wherein said retractor member is fixed to said actuator arm assembly so that when said heads are retracted to said contactable zone of said disks, a torque toward an innermost cylinder of said disks is generated.

15. A rotary actuator in a disk drive according to claim 14, wherein said actuator arm assembly has a projecting portion at the position opposite to the mounting portion of said flexible printed circuit sheet with respect to the center of rotation, and said retractor member is fixed to said projecting portion.

16. A rotary actuator in a disk drive according to claim 15, wherein said retractor member comprises a flat retractor plate set in a shallow groove formed on said projecting portion and fixed to said actuator arm assembly.

17. A rotary actuator in a disk drive according to claim 14, wherein said retractor member comprises a retractor rod inserted in a hole formed on said actuator arm assembly and fixed to said actuator arm assembly.

18. A disk drive comprising:

a housing having a base;

a disk rotatably mounted in said housing;

a plurality of heads each for performing read/write of data on said disk;

a motor for rotating said disk;

an actuator arm assembly rotatably mounted on said base, said actuator arm assembly having one end portion supporting said plurality of heads and another end portion supporting a moving coil, said moving coil having first and second effective portions parallel to an axis of rotation of said actuator arm assembly;

a magnetic circuit fixed to said base and constituting a voice coil motor in combination with said moving coil, said magnetic circuit including:

a main yoke fixed to said base, said main yoke having an inner yoke, a center yoke, and an outer yoke;

an inner magnet mounted on an outer circumferential surface of said inner yoke opposed to said center yoke; and an outer magnet mounted on an inner circumferential surface of said outer yoke opposed to said center yoke, said first effective portion of said moving coil being inserted in an inner gap defined between said inner magnet and said center yoke, said second effective portion of said moving coil being inserted in an outer gap defined between said outer magnet and said center yoke; and a retractor member formed of a magnetic material and fixed to said actuator arm assembly so that said retractor member faces toward an open upper end surface of said magnetic circuit when said heads are at a retracted position, said retractor member retracting said heads to a contactable zone of said disk by a magnetic reaction with a leakage flux generated over the open upper end surface of said magnetic circuit.

* * * * *